T. B. FORD.
COMBINED STOP VALVE, AUTOMATIC LIMITED PRESSURE VALVE, AND FULL PRESSURE SUPPLY VALVE.
APPLICATION FILED SEPT. 23, 1915.
1,216,976.
Patented Feb. 20, 1917.
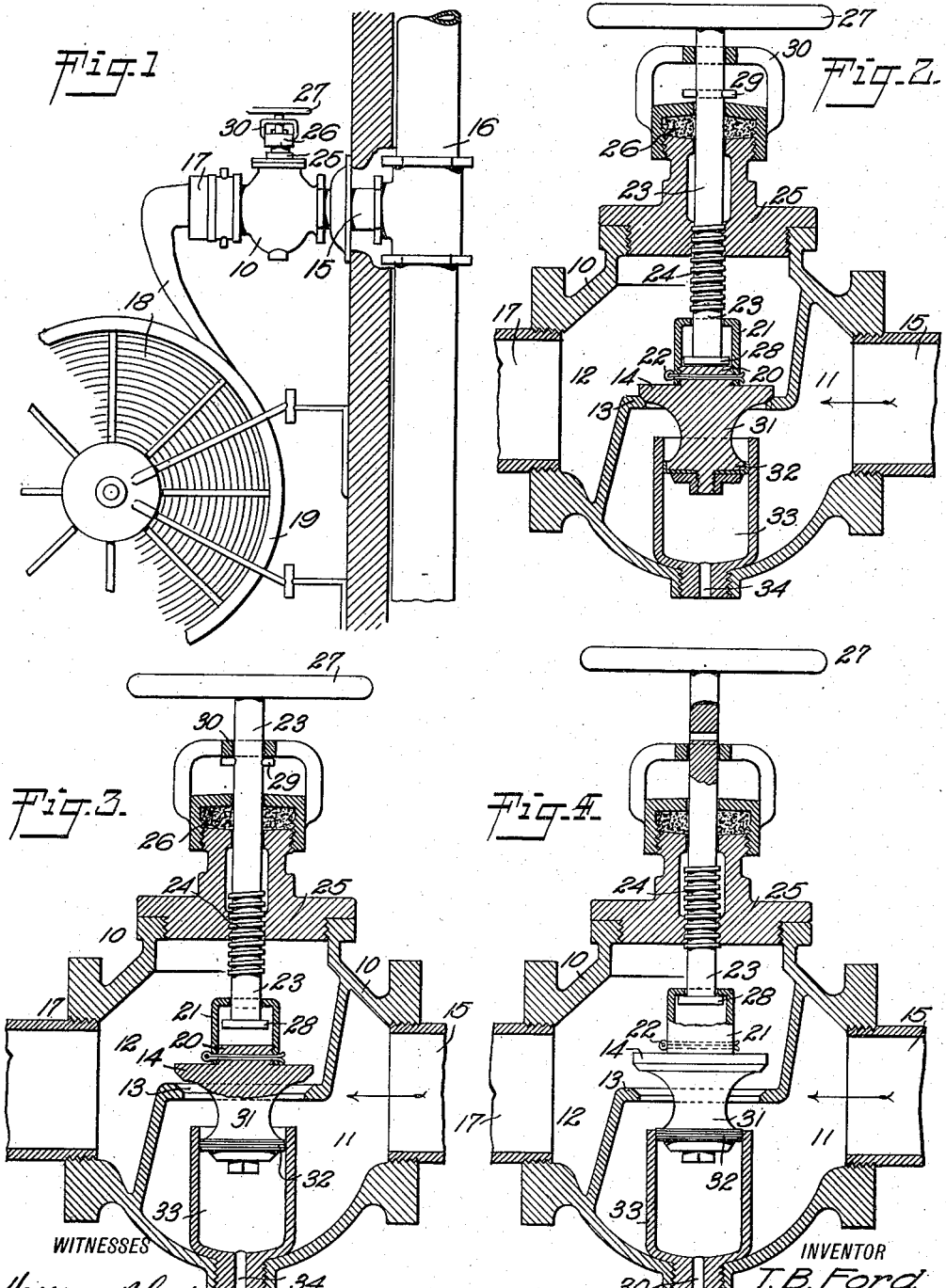
WITNESSES
INVENTOR
T. B. Ford
BY
ATTORNEYS

UNITED STATES PATENT OFFICE.

THOMAS BURTON FORD, OF BROOKLYN, NEW YORK.

COMBINED STOP-VALVE, AUTOMATIC LIMITED-PRESSURE VALVE, AND FULL-PRESSURE SUPPLY-VALVE.

1,216,976.   Specification of Letters Patent.   Patented Feb. 20, 1917.

Application filed September 23, 1915. Serial No. 52,173.

*To all whom it may concern:*

Be it known that I, THOMAS B. FORD, a citizen of the United States, and a resident of the city of New York, borough of Brooklyn, in the county of Kings and State of New York, have invented a new and Improved Combined Stop-Valve, Automatic Limited-Pressure Valve, and Full-Pressure Supply-Valve, of which the following is a full, clear, and exact description.

The invention relates to valves such as are used for controlling the flow of water from a stand pipe to a fire hose.

The object of the invention is to provide a new and improved combined stop valve, automatic limited pressure valve and full pressure supply valve arranged to normally act as a stop valve and to permit an unskilled person or a layman to open the valve for a supply of water at a predetermined reduced pressure in case of an incipient fire in the building, and to enable the firemen or other skilled persons to open the valve for a supply of water under high pressure.

In order to accomplish the desired result use is made of a valve body provided with an inlet, an outlet and a valve seat intermediate the said inlet and outlet, a valve adapted to be seated on the said valve seat and manually controlled means for setting the said valve into stop position, automatic limited pressure position or full pressure supply position.

A practical embodiment of the invention is represented in the accompanying drawings forming a part of this specification, in which similar characters of reference indicate corresponding parts in all the views.

Figure 1 is a side elevation of the valve as applied to connect a stand pipe with a fire hose, the wall of the building being shown in section;

Fig. 2 is an enlarged longitudinal central section of the valve in closed position;

Fig. 3 is a similar view of the same with the parts in position for an automatic limited pressure supply; and Fig. 4 is a similar view of the same with the valve completely open for a high pressure supply.

The valve body 10 is provided with an inlet 11, an outlet 12 and a valve seat 13 intermediate the said inlet 11 and the outlet 12, and a valve 14 is adapted to be seated on the valve seat 13. The inlet 11, as shown in Fig. 1, is connected with a branch pipe 15 of a standpipe 16 and the outlet 12 is connected by a coupling 17 with a fire hose 18 normally wound on a hose reel 19.

The top of the valve 14 is provided with a boss 20 on which screws an inverted cup-shaped member 21, fastened in place by a cotter pin 22, as plainly indicated in the drawings. Into the member 21 extends the lower end of a valve stem 23 provided with a threaded portion 24 screwing in a cap 25 attached to the top of the valve body 10. The cap 25 is provided with a stuffing box 26 through which extends the upper end of the valve stem 23, the outer end of the valve stem being provided with a suitable handle 27 for turning the valve stem 23 with a view to screw the stem inward or outward according to the direction in which the handle 27 is turned at the time. The inner end of the stem 23 is provided with a head 28 adapted to engage the top of the boss 20 to hold the valve 14 normally to its seat 13 thus disconnecting the inlet 11 from the outlet 12. The stem 23 is provided outside of the stuffing box 26 with a pin 29 adapted to abut against the under side of a yoke 30 attached to or forming part of the gland or stuffing box 26. The valve 14 is connected by a stem 31 with a piston 32 mounted to slide in a cylinder 33 attached to the bottom of the valve body 10 within the inlet side of the valve body. The piston 32 is provided with a cup-shaped packing in firm contact with the inner surface of the cylinder 33 to prevent leakage of pressure between the piston and the cylinder. The bottom of the cylinder 33 is provided with an air hole to admit atmosphere into the cylinder against the under face of the piston 32. The piston 32 in the cylinder 33, open at its under side to the atmosphere at all times, provides a pressure reduction means for producing a pressure ratio reduction or effective operating area for the valve 14. By reference to the drawings, it will be noticed that the piston 32 is considerably less in diameter than the valve 14, it being understood that the pressure areas on the bottom and top of the valve are proportioned according to the difference of the pressures on the inlet and outlet sides of the valve. By reference to Figs. 2, 3 and 4, it will be noticed that the head 28 is free to move in the member 21 and when the valve stem 23 is screwed outward into the position shown in Fig. 3 then the pin 29 abuts against the yoke 30 previously mentioned thus limiting the outward screwing movement of the stem 23. The valve 14 is now free to open by the preponderance of pressure on the inlet side of the valve over that of the outlet side, it being understood that the valve only opens a short distance, that is, until the pressures are equalized on the two faces of the valve according to the difference of the pressures on the inlet and outlet sides of the valve. From the foregoing it will be seen that the valve 14 becomes automatic in its action and a limited pressure supply is had. Thus, in case of an incipient fire in a building, a layman or unskilled person can safely open the valve and make use of the hose 18 without danger of being knocked about and injured, as would be the case if the full pressure from the standpipe 16 would pass into the hose 18. When, however, a fireman or other skilled person arrives and wants to make use of the full pressure then he simply removes the pin 29 from the stem 23 and then turns the handle 27 to unscrew the stem 23 still farther, thus causing the head 28 to lift the valve 14 to its full open position, as shown in Fig. 4, so that a full pressure supply of water is allowed to pass from the inlet side to the outlet side and to the hose 18.

It is understood that the pin 29 in conjunction with the yoke 30 forms a positive mechanical limiting means for limiting the travel of the valve stem to allow the pressure reduction means to automatically retain a ratio reduction.

It will also be noticed that the pin 29 can be removed at the will of an operator to allow of moving the valve into full open position thus eliminating the function of the pressure reduction means as an automatic agent.

From the foregoing it will be seen that by the arrangement described the valve can be set to hold the valve 14 firmly closed on its seat 13, as shown in Fig. 2, or the valve can be set to allow automatic opening thereof for supplying a reduced pressure supply, as shown in Fig. 3, or the valve can be positively moved into full open position to allow a full pressure supply to pass from the valve. It is understood that the valve 14 is provided with a piston 32 which is of less diameter than the valve 14 and this piston 32 is mounted to reciprocate in the cylinder 33 which has its upper end opening into the inlet or high pressure side 11, and which has its lower end connected by the port 34 with the atmosphere. By the differential piston arrangement shown the effective upward pressure against the valve 14 is reduced and a constant ratio is had between the area of the upper face of the valve 14 exposed to back pressure and the area of the piston exposed to the inlet pressure. When the valve 14 is partly opened the piston 32 in the cylinder 33 provides an actual automatic means for producing a limited pressure on the outlet side 12 with a higher pressure present in the inlet side 11, that is, the arrangement described provides a means for producing an effective operating area. The partial opening of the valve is limited by the pin 29 abutting against the yoke 30 and hence a ratio pressure is maintained between the inlet side 11 and the outlet side 12 by the use of the piston 32 and its cylinder 33, and this ratio pressure cannot be changed as long as the pin 29 is in position on the valve stem 23 especially as the head 28 of the valve stem 23 is now in neutral position within the valve member 21 and only the ratio arrangement now prevails. When the valve 14 is moved into full open position, after the removal of the pin 29, then the pressure is practically equal in both the inlet side 11 and the outlet side 12 and the pressure on the top of the piston 32 now tends to move the valve 14 into closed position owing to the lower pressure on the under side of the piston 32, but this valve 14 is held fully open by the head 28 engaging the top of the valve member 21.

The valve shown and described is very simple in construction and composed of comparatively few parts, not liable to get out of order easily.

Having thus described my invention, I claim as new and desire to secure by Letters Patent:

1. A combined stop valve, automatic limited pressure valve and full pressure supply valve, comprising a valve body provided with an inlet, an outlet and a valve seat intermediate the said inlet and outlet, a valve adapted to be seated on the said valve seat and provided with a pressure reduction means for producing an effective operating area for the said valve, a valve stem, manually controlled means for moving the said valve stem in the direction of its length, lost motion connection between the said valve and the valve stem, and a removable limiting means on the said valve stem to limit the movement of the valve for a limited pressure position or to allow the valve to be moved into full pressure position.

2. A combined stop valve, automatic limited pressure valve and full pressure supply valve, comprising a valve body provided with an inlet, an outlet and a valve seat intermediate the said inlet and outlet, a valve adapted to be seated on the said valve seat and provided with a pressure reduction means for producing an effective operating area for the said valve, a valve stem under the control of an operator and slidably engaged by the said valve, the said valve stem normally holding the said valve to its seat, and removable limiting means connected with the said valve stem to allow partly automatic opening of the valve for a limited pressure supply when the said means are in one position, and to allow full opening of the valve for a full pressure supply when the said means are in another position.

3. A combined stop valve, automatic limited pressure valve and full pressure supply valve, comprising a valve body provided with an inlet, an outlet and a valve seat intermediate the said inlet and outlet, a valve adapted to be seated on the said valve seat and provided with a pressure reduction means for producing an effective operating area for the said valve, a valve stem under the control of an operator and slidably engaged by the said valve, the valve stem normally holding the said valve to its seat, the said valve stem being movable in the direction of its length, a fixed part on the said valve body, and a removable member on the said valve stem and adapted to abut against the said fixed part to limit the movement given to the said stem by an operator, the said member when removed allowing the stem and with it the said valve to be moved to full open position.

4. A combined stop valve, automatic limited pressure valve and full pressure supply valve, comprising a valve body provided with an inlet, an outlet and a valve seat intermediate the said inlet and outlet, a valve adapted to be seated on the said seat, a pressure reduction means for the said valve and under the influence of atmospheric pressure, and exterior mechanical limiting means for limiting the travel of the valve to allow the said pressure reduction means to automatically retain a ratio pressure.

5. A combined stop valve, automatic limited pressure valve and full pressure supply valve, comprising a valve body provided with an inlet, an outlet and a valve seat intermediate the said inlet and outlet, a valve adapted to be seated on the said seat, a pressure reduction means for the said valve and under the influence of atmospheric pressure, and exterior mechanical limiting means for limiting the travel of the valve to allow the said pressure reduction means to automatically retain a ratio pressure, the said mechanical limiting means having a member removable at the will of an operator to allow moving the valve into full open position.

6. A combined stop valve, automatic limited pressure valve and full pressure supply valve comprising a valve body provided with an inlet, an outlet and a valve seat intermediate the said inlet and outlet, a valve adapted to be seated on the said seat, a cap for the said valve body, a valve stem screwing in the said cap, a yoke carried by the cap and through which passes the valve stem, lost motion connection between the said stem and valve whereby the valve may be operated manually by the stem or automatically independently of the stem, a pressure reduction means for the said valve and under the influence of atmospheric pressure, and mechanical exterior limiting means on the said stem and coacting with the said yoke for limiting the travel of the valve to allow the said pressure reduction means to automatically retain a ratio pressure.

7. A combined stop valve, automatic limited pressure valve and full pressure supply valve comprising a valve body provided with an inlet, an outlet and a valve seat intermediate the said inlet and outlet, a valve adapted to be seated on the said seat, a cap for the said valve body, a valve stem screwing in the said cap, a yoke carried by the cap and through which passes the valve stem, lost motion connection between the said stem and valve whereby the valve may be operated manually by the stem or automatically independently of the stem, a pressure reduction means for the said valve and under the influence of atmospheric pressure, and mechanical exterior limiting means on the said stem and coacting with the said yoke for limiting the travel of the valve to allow the said pressure reduction means to automatically retain a ratio pressure, the said mechanical limiting means having a member removable at the will of an operator to allow of moving the valve into full open position.

In testimony whereof I have signed my name to this specification in the presence of two subscribing witnesses.

THOMAS BURTON FORD.

Witnesses:
TheO. G. Hoster,
Philip D. Rollhaus.

Copies of this patent may be obtained for five cents each, by addressing the "Commissioner of Patents, Washington, D. C."